INVENTOR.
EDWARD J. STARK
DONALD S. BUGNI
KENNETH L. PAAPE

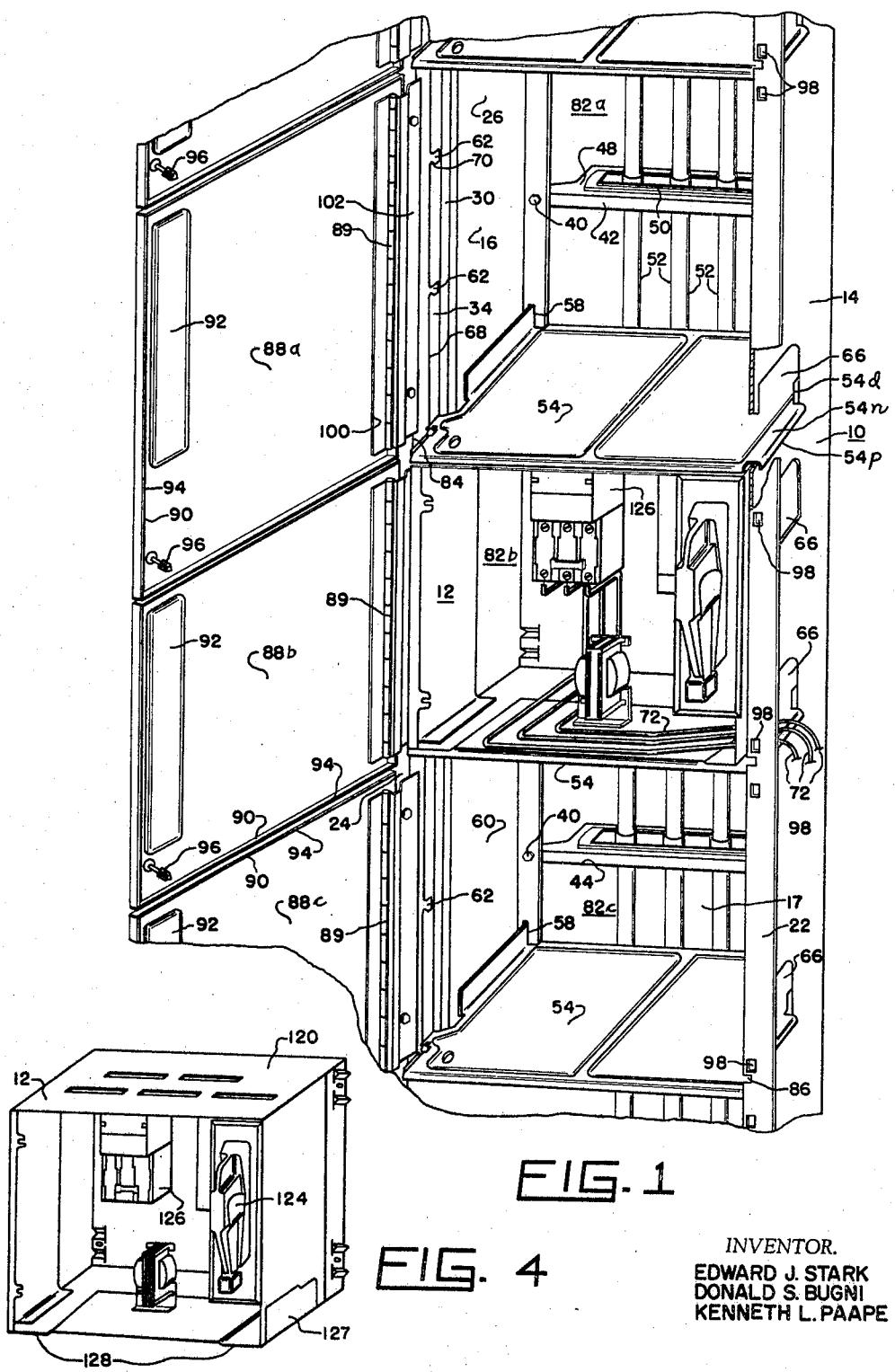

United States Patent Office 3,482,143
Patented Dec. 2, 1969

3,482,143
UNIT MOUNTING PAN FOR AN ELECTRICAL
ENCLOSURE STRUCTURE
Edward J. Stark, Whitefish Bay, Donald S. Bugni, Milwaukee, and Kenneth L. Paape, Mequon, Wis., assignors to Square D Company, Park Ridge, Ill., a corporation of Michigan
Filed Dec. 11, 1967, Ser. No. 689,538
Int. Cl. H02b 1/10
U.S. Cl. 317—120                            6 Claims

ABSTRACT OF THE DISCLOSURE

This invention comprises a unit mounting pan for an electrical control center structure that may be installed without hardware or tools in any one of a plurality of different locations in a control center structure without disturbing control units installed on mounting pans above or below the location involved and which will provide a stop for doors and blank covers for the control center, a smooth surface for wires to the control unit supported by the pan, a spacer to maintain the horizontal spacing between the side walls supporting the pan and a means having minimum friction for guiding a separable control unit into proper position in the structure of the control center.

---

This invention relates to electrical distribution system structures and is more particularly concerned with a supporting and enclosing means for electric circuit controlling instrumentalities.

In modern industrial plants, in which a plurality of electrical devices for the protection and control of electrical circuits are required, it has become increasingly necessary that these circuit controlling instrumentalities be mounted and arranged in a readily accessible position, yet be so disposed as to minimize the danger inherent in electrical circuits. It is obviously necessary that this disposition be effected with, however, a minimum space and that the addition of other such instrumentalities to the group already in operation, as the expansion of the electrical requirements in the particular plant occurs, may be readily made. It is, of course, further required that the operating efficiency of the instrumentalities should be maintained at its highest level, and that the maintenance which these instrumentalities may require may be effected with ease. It is further of value that the arrangement of the devices be such as to have a pleasing appearance.

It is an object of the present invention to provide a control unit structure for an electrical distribution system which has a maximum flexibility for installation and modification.

A further object is to provide a control unit structure for an electrical distribution system with unit mounting pans which may be installed in the structure in selected positions in the structure without tools and when installed will separate large vertical compartments into smaller compartments, the size of which may be selectively varied, to accommodate different sizes of separable insertible units which support devices for controlling the distribution circuits.

An additional object is to provide a control center structure with unit mounting pans which may be installed without hardware or tools in any one of a plurality of different locations in the control center structure without disturbing control units installed on mounting pans above or below the location involved and which will provide a stop for doors and blank covers for the control center, a smooth surface for wires to the control unit supported by the pan, a spacer to maintain the horizontal spacing between the side walls supporting the pan and a means having minimum friction for guiding a separable control unit into proper position in the structure of the control center.

Further objects and features of the invention will be readily apparent to those skilled in the art from the specification and appended drawing illustrating certain preferred embodiments in which:

FIG. 1 is a front perspective view of a portion of a modular control unit cabinet incorporating unit mounting pans according to the present invention.

FIG. 4 is a reduced size perspective view of a separable control unit detached from the cabinet in FIG. 1.

Figure 3:
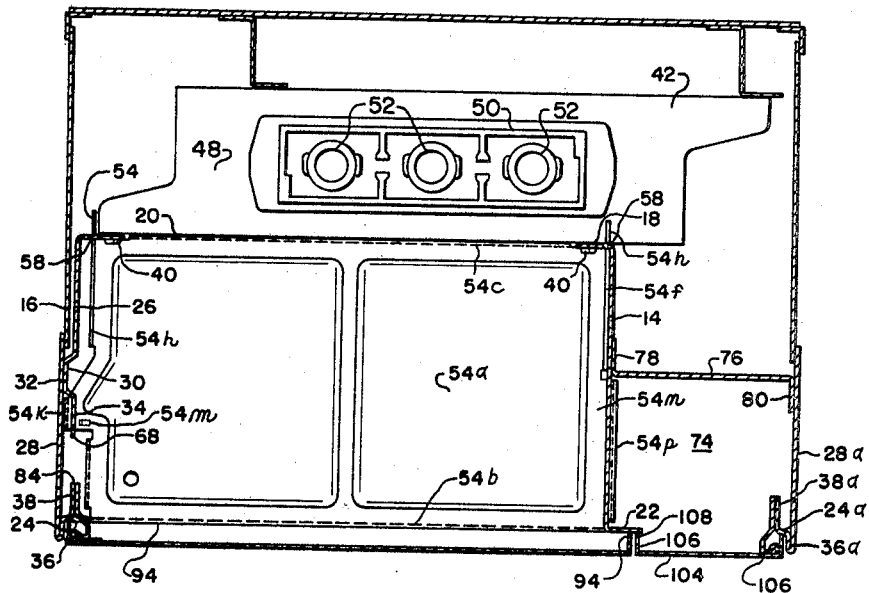
FIG. 3 is a top elevational view of the mounting pan in FIG. 2 as mounted in the cabinet in FIG. 1 with a portion of the cabinet including a wire trough and door therefor shown in cross section.
Figure 2:
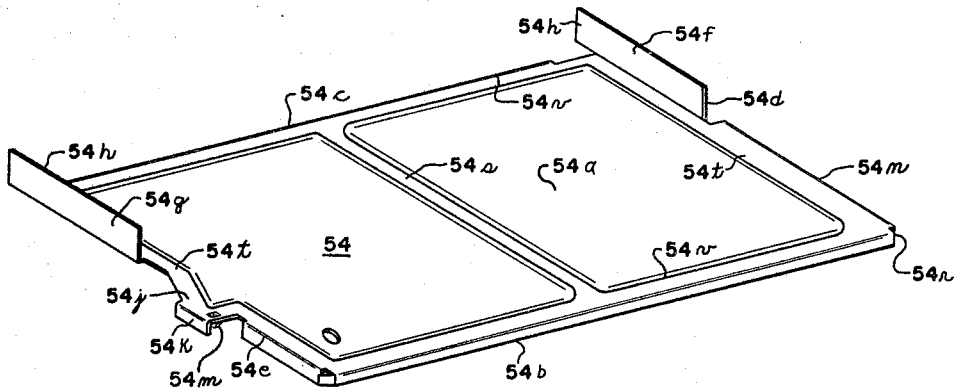
FIG. 2 is a perspective view of one of the mounting pans detached from the cabinet in FIG. 1.

Referring to the drawings, and particularly to FIG. 1, a portion of a vertical section of the electrical control unit structure 10 shown is incorporated in the structure illustrated in an application for U.S. design patent, Ser. No. 9,730, and a structure having proportions disclosed in an application for U.S. patent, Ser. No. 689,412, concurrently filed herewith. The structure 10 provides a support and an enclosure for a plurality of individual separable protective and control units, one of which is shown and designated by the numeral 12 in FIGURE 1. As is well known, a plurality of sections including the structure 10 may be assembled side by side and/or back to back into a control group usually referred to as a control center.

Each of the structures 10 includes a pair of spaced side walls 14 and 16 which define an elongated vertical opening 17 and, as shown in FIG. 3, respectively have inwardly turned continuous flanges 18 and 20 formed along a rear marginal wall and continuous flanges 22 and 24 at a front marginal edge. The wall 14 is formed as a unitary vertically extending part having the flange 18 turned inwardly at its rear marginal edge and the flange 22 turned outwardly at the front edge. The wall 16 is formed of a pair of vertically extending members 26 and 28. The member 26 has the flange 20 formed thereon and includes a continuous vertically extending indented portion 30 which is secured, by welding or riveting, to an inner wall surface 32 of the member 28. The portion 30 is located in the member 26 to provide a continuous vertically extending portion 34 that is spaced from the surface 32 and extends forwardly toward the flange 24. The flange portion 24 is formed by folding the material of the member 28 back on itself to provide a continuously extending lip 36, the flange 24 and a jamb surface 38. As shown, the lip 36 extends forwardly of the flange 24 and the jamb surface is spaced from the wall 32 and extends rearwardly of the flange 24.

Secured rearwardly of the flanges 18 and 20 by suitable screws 40 are at least a pair of vertically spaced members 42 and 44 that extend horizontally and maintain the horizontal spacing between the rear marginal edges of the walls 14 and 16. The spaced members 42 and 44 are formed as U-shaped channel members having a pair of spaced downwardly extending flanges extending from a bight portion 48 that is apertured to receive an insulating block 50. Extending through spaced apertures in each insulating block 50 are three spaced bus bars 52 which extend vertically and are electrically connected and mechanically supported by a horizontal bus bar structure, not shown.

Formed in the structure 10 at definite equal vertically spaced intervals are a plurality of sets of supporting surfaces for supporting unit mounting pans 54 in any one of a plurality of vertically spaced locations in the vertical opening 17. The supporting surfaces of each set are provided by the lower surfaces along the lower edge of vertically extending openings 58 in the flanges 18 and 20, the lower surface of notches 62 in the vertical portion 34 of the side wall 16 and the lower surface of openings 66 in the side wall 14. The lower surfaces of the openings 58 and 66 as well as the notch 62 of each set are aligned in a common horizontal plane. The notches 62 extend rearwardly of a front edge 68 in the vertical portion 34 and are formed to provide a projection 70 extending upwardly of the surface 60. The openings 66 are located adjacent the front flange 22 and are of a size to provide a passage for wires 72 extending from a vertically extending wire trough 74 into the vertical opening 17. As shown in FIG. 3, a side wall of wire trough 74 is provided by a wall member 28a that is identical to the member 28 and reversed end for end to provide the lip 36a, the front flange 24a and the jamb surface 38a with the flanges 24 and 24a respectively extending toward the wall 14. The rear wall of the wire trough 74 is provided by a member 76 having flanged portions 78 and 80 secured to the wall 14 and the member 28a.

Positioned on the lower supporting surfaces of the openings 58 and 66 and the notches 62 of selected sets of supporting surfaces are the unit mounting pans 54 which divide the vertical opening 17 into vertically spaced compartments indicated by numerals 82a, 82b and 82c in FIG. 1. The height of the compartments 82a, b and c is a multiple of the vertical spacing between the sets of supporting surfaces with the compartment 82a occupying the space between three vertically spaced sets of surfaces and the compartments 82b and 82c occupying the space between two sets of vertically spaced surfaces. Each of the mounting pans 54 is identical and, as shown in FIG. 4, are formed of a unitary metal part to have a base 54a, with downwardly extending flanges 54b and 54c formed along the front and the rear edges of the base 54a. Upwardly extending along opposite side edges 54d and 54e of the base 54a to be positioned adjacent the walls 14 and 16 are flanges 54f and 54g which act as guides for guiding the separable control units 12, shown in FIG. 4, into the compartments 82a-c. Each of the flanges 54f and 54g has a portion 54h extending rearwardly of the rear edge of the base 54a received in the openings 58 in the flanges 18 and 20 with the bottom surface of the extending portions 54h resting on the bottom surfaces of the openings 58 to vertically position the rear edge 54c of the base 54a in the opening 17 in close proximity to the flanges 18 and 20. Extending outwardly of the side edge 54e is a projection 54j. The projection 54j has a downwardly turned end 54k engaging the surface 32 of the wall 16 and a downwardly lanced portion 54m. The lanced portion 54m presents a free edge which engages the portion 34. The projection 54j vertically positions the side edge 54e of the pan 54 in the opening 17 as it is positioned adjacent the projection 70 and rests on the bottom surface of the notches 62. The end 54k and the lanced portion 54m are provided to prevent horizontal movement of the side edge 54e in the opening 17. The projection 54j is sized to pass between the vertical edge 68 and a vertical edge 84, shown in FIG. 3, when the pan 54 is inserted into the opening 17. As shown in FIG. 1, extending outwardly of the edge 54d into the opening 66 is a projection 54n which has a bottom surface resting on the lower surface of the opening 66 and a downwardly turned portion 54p extending downwardly along the wall 14 in the wire trough 74. The portion 54p provides a cover for the lower surface of the opening 66 and presents a rounded surface to prevent abrasion of the insulation covering the wires 72 entering the compartments 82a-c from the wire trough 74. Located in the side wall 14 and extending into the flange 22 at elevations slightly above the lower surfaces of each of the openings 66 are notches 86 which are sized to permit passage of the projections 54n into the opening 17 when the pans 54 are installed in the opening 17. As the notches 86 are located slightly above the lower surfaces of the openings 66, the side wall 14 and the flange 22 provide metal material which is disposed between the notches 86 and a plane through the lower surfaces of the openings 66. The metal material is received by a notch 54r located on the pan 54 at the intersection of the front flange 54b and the projection 54n. The notch 54r, when properly positioned, prevents outward movement of the pan 54 from the opening 17 as well as movement of the wall 14 toward the wall 16. As shown, the base 54a is embossed to provide a central rib 54s and ribs 54t adjacent each of the edges 54d and 54e as well as ribs 54v along the front and rear edges of the pan 54. The ribs 54s, t and v add rigidity to the pan 54 and provide a low friction surface for the movement of the units 12 when the units are installed in the compartments 82a-c. When the pans 54 are installed between the walls 14 and 16, the downwardly extending portions of the curved surface 54p will engage the wire trough 74 side of the wall 14 while portions of the notches 54r engage portions of the flange 22 and wall 14 located below notches 86. Similarly, the downwardly extending edge 54k will engage the wall 32 while the lanced portion engages the portion 34 and the projection 54j is positioned rearwardly of the projection 70 so the front edges of the walls 14 and 16 will be maintained against movement relative to each other.

Each of the compartments 82a-c is closed by a door having a height equal to the spacing between the pans 54 which are inserted in the opening 17 to define the compartments. Thus the door 88a closing the compartment 82a will be three spaces high while the doors 88b and 88c closing the compartments 82b and 82c will be two spaces high. Each door 88a-c has a continuous peripheral flange 90 and a rectangular opening 92. The flange 90 provides an edge 94. The doors 88a-c are mounted on the wall 16 by hinges 89. When the doors 88a-c are closed, the edges 94 adjacent the hinge 89 will be juxtaposed to the flange 24. The flanges 54b on the pans 54 defining the top and bottom of the compartments 82a-c will be adjacent the edges 94 when the compartments 82a-c are closed by doors 88a-c while the edge 94 on the flange 90 adjacent the flange 22 engages the flange 22. The doors 88a-c are maintained in a compartment closing position by suitable fastening screws 96 extending through suitable openings in the doors 88a-c and threaded into fasteners 98 carried by the flange 22. The hinge 89 for the doors 88a-c is preferably accomplished by a piano-type hinge having a portion 100 secured to the doors 88a-c and a portion 102 secured to the jambs 38. Similarly, the opening to the wire trough 74 is closed by a door 104 that has a continuous peripheral flange 106 providing an edge 108. The door 104 is hingedly mounted on the member 28a to have the edge 108 of the door 104 engage the flange 22 when the door 104 is closed. The door 104 is maintained closed by suitable fastening screws, not shown. The hinge mounting for the door 104 may be accomplished by either a piano-type hinge or spaced individual hinges having a portion secured to the flange 106 and a portion secured to the jamb 28a so the flange 106 is juxtaposed to the flange 24a when the door 104 is closed. Thus when all of the doors 88a-c are closed, and the pans 54 are installed in the opening 17, as described, the compartments 82a-c will be effectively separated from each other as the horizontal flanges 90 of the vertically adjacent doors will be juxtaposed to each other and to a common flange 54b. Further, when the door 104 also is closed, the vertical flanges 90 and 106 engaging the flange 22 will be juxtaposed to each other and the portion of the doors 88a-c and 104 adjacent the lips 36 and 36a will be substantially flush with the forward edge of the lips 36 and 36a to protect the hinges from damage and present an uninterrupted appearance to the front of the structure 10.

The separable control units 12, as shown in FIG. 4, which are insertable into the compartments 82a–c, each include a U-shaped saddle 120 having a vertical dimension slightly smaller than the height of the compartment wherein it is installed. Thus the saddle 120 which is received in compartment 82a will have a vertical height slightly less than three spaces, while the saddles 120 received in the compartments 82b and 82c will have a vertical height slightly less than two spaces. Secured on a rear face of a rear wall 122 of the saddle 120 are suitable clips, not shown, carried by an insulating member, also not shown, to engage the bus bars 52 when the control unit 12 is installed in the compartments 82a–c. Secured on a forward face of the rear wall 122 of the saddle are electric circuit making and breaking units of the conventional type. The circuit making and breaking units may include a device known as a circuit breaker which is operated by a handle mechanism 124 that extends through the opening 92 in the door in a manner disclosed in application for U.S. patent, Ser. No. 654,825, filed July 20, 1967. As in conventional practice, the leads from the clips engaging the bus bars 52 on the rear wall of the saddle 120 are connected to the line terminals of the circuit breaker. The load terminals of the circuit breaker in turn may be connected to the line terminals of a contactor or starter 126 which may be of the type disclosed in the application for U.S. patent, Ser. No. 473,299, filed July 20, 1965. The load terminals of the starter 126 are connected to the wires 72 which extend through a suitable opening 127 in the saddle that is aligned with the opening 66. When the saddle 120 is installed in the compartments, portions of a bottom wall 128 of the saddle 120 slide across the ribs 54s and 54t with a minimum friction. After the saddle 120 is installed in the compartments 82a–c it may be maintained against movement by suitable fastening elements extending through openings in the rear wall of the saddle into engagement with fastening devices, not shown, carried by the flanges 18 and 20 so as to maintain the engagement between the clips and the bus bars 52.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. An electrical control unit structure comprising: a pair of vertically extending parallel side walls horizontally spaced to define a vertical opening, a continuous flange at a rear marginal edge and a continuous flange at a front marginal edge of each of the side walls, a pair of horizontally extending vertically spaced members secured to the rear flanges of each of the side walls, said members providing a support for a bus bar insulating member and means for maintaining the horizontal spacing between the rear marginal edges of the side walls, a unit mounting pan having a pair of side edges extending between a rear and a front edge of the pan, means including a plurality of vertically spaced sets of supporting surfaces supporting the unit mounting pan in a horizontal plane at any one of a plurality of vertical equally spaced locations in the vertical opening, the supporting surfaces of each of said sets including a bottom surface of openings in both of the rear flanges, and in both of the side walls, said means further including ears projecting from the side edges and the rear edge of the mounting pan extending into the openings and engaging the supporting surfaces, a door having a height equal to a multiple of the vertical spacing between the supporting surfaces of the sets, said door having a first vertical edge hinged on the front marginal edge of a first one of the pair of side walls and a second vertical edge engaging the flange on the front marginal edge on a second one of the pair of side walls other than said one side wall for closing a portion of the vertical opening when the door is closed, said unit mounting pan additionally having: raised upwardly extending flanges along the side edges for guiding a separable unit structure into a predetermined position in the vertical opening and providing a support for the separable unit when the unit is in the predetermined position in the vertical opening, a downwardly extending flange on the front edge of the pan juxtaposed to a bottom horizontal edge of the door when the door is closed and portions engaging portions of both side walls for maintaining the horizontal spacing between the front marginal edges of the side walls.

2. The combination as recited in claim 1 wherein the mounting pan includes spaced slide portions engaging a bottom wall of the separable unit structure when the separable unit is moved into the predetermined position in the control unit structure.

3. The combination as recited in claim 1 wherein the downwardly extending flange includes a portion engaging the second side wall for maintaining the horizontal spacing between the front marginal edges of the side walls.

4. The combination as recited in claim 1 wherein the ear extending into the opening in the second side wall includes a curved surface which resets on the supporting surface in the second side wall to protect an insulating cover for a wire extending through the opening in the second side wall.

5. The combination as recited in claim 1 wherein the insulating members position a plurality of vertically extending horizontally spaced bus bars rearwardly of the rear flanges of the side walls, the separable units include conducting clip electrical connectors and the guide means are disposed to guide the clip connectors into engagement with the bus bars when the separable unit is moved into the predetermined position in the structure.

6. The combination as recited in claim 4 wherein the control unit structure includes a third side wall that is identical to a portion of the first wall and positioned adjacent the second side wall to provide a vertically extending wire trough that extends parallel to the vertical opening to receive wires extending through the opening in the second wall and a door having a first vertical edge hinged to a front marginal flanged portion of the third side wall and a second vertical edge engaging the front flange of the second side wall when the door is positioned to close the wire trough.

References Cited
UNITED STATES PATENTS

| | | | |
|---|---|---|---|
| 3,041,506 | 6/1962 | Schlessel et al. | 317—120 |
| 3,303,395 | 2/1967 | Eck | 317—120 X |
| 3,311,793 | 3/1967 | Kussy et al. | 317—120 |

LEWIS H. MYERS, Primary Examiner

GERALD P. TOLIN, Assistant Examiner